United States Patent
Clark et al.

[15] 3,660,120
[45] May 2, 1972

[54] FRICTION MATERIALS

[72] Inventors: Eric Clark, Stockport; Roger Adrian Summerling, Leek, both of England

[73] Assignee: Ferodo Limited, Manchester, England

[22] Filed: May 14, 1968

[21] Appl. No.: 728,892

[30] Foreign Application Priority Data

May 15, 1967 Great Britain ....................22,463/67

[52] U.S. Cl. .................................................106/36, 106/286
[51] Int. Cl. ............................................................C09k 3/14
[58] Field of Search ...........................................106/36, 286

[56] References Cited

UNITED STATES PATENTS

| | | | |
|---|---|---|---|
| 646,301 | 3/1900 | Morrison et al. | 106/36 |
| 2,252,991 | 8/1941 | Steck | 106/36 |
| 2,966,737 | 1/1961 | Spokes et al. | 106/36 |
| 3,402,054 | 9/1968 | Wood | 106/36 |

FOREIGN PATENTS OR APPLICATIONS 740,820 11/1955 Great Britain ..........................106/36

Primary Examiner—Donald J. Arnold
Assistant Examiner—James B. Lowe
Attorney—Sughrue, Rothwell, Mion, Zinn & Macpeak

[57] ABSTRACT

A friction material comprising an inorganic fiber, such as asbestos, and a binder wholly or substantially wholly composed of metallic sulphide formed in situ, the metallic sulphide consisting of iron sulphide formed by the reaction of sulphur with iron powder or with lower iron sulphide, with or without copper sulphide formed by reaction of sulphur with copper powder or with cuprous sulphide. Additional materials such as metallic powders, fillers, antioxidants and friction modifiers may be included in the friction material. The material may be formed by a method which comprises compacting and curing a mixture of ingredients which contains sulphur with iron powder or lower iron sulfide, optionally with copper powder or cuprous sulphide. Curing may be carried out under a pressure of from 2 to 20 tons per square inch in the temperature range of 80° C to 600° C depending on the proportions of the sulphides in the binder.

5 Claims, No Drawings

FRICTION MATERIALS

BACKGROUND OF THE INVENTION

1. Field of the Invention

The invention broadly relates to friction materials which comprise an inorganic fiber and a binder substantially wholly composed of a metallic sulfide formed in situ.

2. Description of the Prior Art

Friction materials used as brake linings, disc brake pads, clutch facings or railway brake blocks are commonly made under suitable conditions of temperature and pressure from asbestos or other inorganic fiber and other ingredients which may include rubber, metallic powders, mineral fillers, cured rubber powders, graphite, rubber-curing ingredients, antioxidants and lubricants. A binder is always present, and a resin is commonly added to the mix to act as a binder. Rubber itself will act as a binder, and rubber and resin may be present together; vegetable oils can also be used as binders, again with or without rubber.

Friction materials containing conventional organic binding agents exhibit poor frictional stability under varying temperature conditions. Considerably higher temperatures are generated in disc brakes than in drum brakes, with the result that organically-bound friction materials are more likely to disintegrate; the thermal degradation of such binders results in inferior frictional characteristics, giving rise to fade and often resulting in increased wear. Furthermore, organic materials, particularly resins, tend to have a short shelf life, and are not always easy to reproduce.

In an attempt to overcome the deleterious effects of poor thermal resistance in a friction material having an organic binder, various sintered metal and ceramic materials in which the sintering effects the bonding have been developed. However, sintering is normally a high-temperature process, and may, for example, be carried out at temperatures in excess of 750° C, necessitating the use of controlled or conditioned atmospheres and other complicated manufacturing techniques.

SUMMARY OF THE INVENTION

It has been found that a friction material comprising an inorganic fiber, such as asbestos, and a binder substantially wholly composed of metallic sulfide formed in situ will exhibit enhanced frictional stability under varying temperature conditions.

The metallic sulfide generally consists of iron sulfide formed by the reaction of sulfur with iron powder, or with a lower iron sulfide. Copper sulfide, formed by the reaction of sulfur with copper powder or with cuprous sulfide, may also be present.

It is critical that the binder be formed in situ.

Additional materials such as metallic powders, fillers, antioxidants and friction modifiers may be included in the friction material.

A process for forming the friction material comprises compacting and curing a mixture of ingredients which contains sulfur with iron powder or a lower iron sulfide. Optionally, copper powder or cuprous sulfide may be present.

The curing may be carried out under a pressure of from 2 to 20 tons per square inch at a temperature in the range of from about 80° C to about 600° C, depending on the proportions of the sulfides in the binder.

DESCRIPTION OF THE PREFERRED EMBODIMENTS

According to the invention, the binder is wholly or substantially wholly composed of metallic sulfide formed in situ, the metallic sulfide consisting of iron sulfide formed by reaction of sulfur with iron powder or with lower iron sulfide, with or without copper sulfide formed by reaction of sulfur with copper powder or with cuprous sulfide. The copper sulfide binder may thus be cupric or cuprous sulfide; if a cupric sulfide binder dissociates after being formed the resultant cuprous sulfide still acts as a binder.

Iron and sulfur form a wide range of compounds with non-stoichiometric formulas, apart from the two defined sulfides FeS and $Fe_2S_3$. In this specification we refer to any such compounds as iron sulfides, whether they have a well-defined formula or not. At the same time, we classify as lower iron sulfides those iron sulfides which are capable of reacting with further sulfur to form higher valency state iron sulfides.

Iron sulfide may form the sole binder in the friction material, or the binder may be formed partly of iron sulfide and partly of copper sulfide. A friction material formed from asbestos or other inorganic fiber with fillers and friction modifiers will normally require a content of at least 10 percent by volume of binder calculated as metal sulfide. This figure is dependent to a certain extent on the content of inorganic fiber or of other constituents, but will usually give a satisfactory material. The proportion of metal sulfide may, of course, be increased, but any metal sulfide in excess of about 50 percent by volume is no longer acting as a binder, but as a filler. The friction material may also contain other conventional additives, for example metallic powders such as lead, tin, brass and aluminum, fillers such as barytes, rottenstone-whiting, carbon black and organic materials, and friction modifiers, such as graphite, alumina, silica and metal oxides. Inorganic fibers other than asbestos include glass fibers and metallic fibers.

We prefer to form the iron sulfide binder from iron powder and sulfur. The ratio of iron to sulfur may be varied over wide ranges, the preferred limits being iron to sulfur of 4:1 to 1:1½ by weight. Any iron powder or sulfur which is not combined as iron sulfide will be present as a filler, and the presence of uncombined iron or sulfur in the friction material may even be advantageous. When copper sulfide forms part of the binder, the presence of uncombined copper in the friction material may similarly be advantageous.

Iron is cheaper than copper, but on the other hand does not react so readily with sulfur, so that the curing temperature must be raised accordingly. The properties of the finished friction material are comparable, whether the binder is solely iron sulfide or is a mixture of iron and copper sulfides and so the choice of proportions can be selected to suit any given circumstances. Curing times for a friction material in which iron sulfide is the sole binder sulfide are preferably from one-half minute upwards at pressures of from 2 to 20 tons/in² and temperatures of from 300° to 600° C; if the binder also contains copper sulfide, then curing temperature may be less than 300° C, even down to as low as 80° C, depending on the relative proportions of iron sulfide and copper sulfide. The times, temperatures and pressures are, of course, interdependent, but in general the curing times will not exceed 10 minutes.

In general friction materials according to the invention will contain from 15 to 50 percent by volume of asbestos or other inorganic fiber, and the fibers most commonly used are those of Grades 5 and 7. The asbestos or other fiber and metallic sulfide binder together will normally constitute at least 25 percent by volume of the friction material, the content by volume of fillers, lubricants or other additives thus being from 0 to 75 percent.

Two Examples will now be given (all parts being by weight):

EXAMPLE 1

The following ingredients were mixed together, and disintegrated through an ⅛-inch-mesh screen.

| Ingredient | Parts |
| --- | --- |
| iron powder | 29 |
| sulfur | 16.5 |
| graphite | 18.8 |
| asbestos fiber (Grades 5 & 7) | 21.3 |
| silica | 10.4 |
| alumina | 4.0 |

The mixture was then cold compacted, and cured for 8 minutes at a pressure of 2 tons/in² and a temperature of 600° C.

EXAMPLE 2

The following ingredients (with exception of the copper powder) were mixed together, disintegrated through an ⅛-inch-mesh screen, and then spread in shallow pans to cool.

| Ingredient | Parts |
| --- | --- |
| iron powder | 14.5 |
| copper powder | 14.5 |
| sulfur | 16.5 |
| graphite | 18.8 |
| asbestos fiber (Grades 5 & 7) | 21.3 |
| silica | 10.4 |
| alumina | 4.0 |

The copper powder was then mixed in, the mixture cold-compacted, and cured for 5 minutes at a pressure of 2 tons/in$^2$ and a temperature of 450° C.

In forming the mixture of ingredients, all the constituents except for any copper or cuprous sulfide are mixed and disintegrated. The mixture may then be spread out in shallow trays to cool, and allowed to stand for 24 hours in order to eliminate the fire risk which would arise if finely divided materials, warmed by the mixing step, were stored in containers. Any copper powder or cuprous sulfide may then be added and the materials mixed for a further 10 minutes. If copper powder or cuprous sulfide were mixed in initially, there would be a danger of sufficient heat being generated in the disintegration step to initiate the exothermic reaction between the sulfur and copper or cuprous sulfide.

After the initial mixing step, the product may be left for as long as required. However, once copper powder or cuprous sulfide has been added, it is desirable that the mixture be cured as soon as possible because its flow characteristics tend to deteriorate.

The friction characteristics of the materials of Examples 1 and 2 were tested in a disc brake system on an inertia dynamometer using an automobile disc brake caliper and a cast iron braking disc 9¾ inches in diameter and one-half inch thick. Two friction buttons formed from the material were placed in the caliper opposite each other on opposite sides of the braking disc. The tests were designed to simulate normal usage of automobile brakes, two sets of conditions being used as follows:

Test (A): 300 applications of the brake were made, $2.46 \times 10^4$ ft lb. of kinetic energy being dissipated at each application, with 60 seconds intervals between applications. Braking torques of 180 and 360 lb ft. respectively were used for alternate groups of 25 applications, the stopping times at these torques being 2.8 and 1.4 sec respectively. The brake disc temperature was 120° C at the beginning of each of the applications.

Test (B): 200 applications of the brake were made, $4.23 \times 10^4$ ft.lb. of kinetic energy being dissipated at each application, with 40 seconds intervals between applications. Braking torques of 180 and 360 lb ft. respectively were used for alternate groups of 25 applications, the stopping times at these torques being 2.0 and 4.0 secs. respectively. The brake disc temperature was 210° C at the beginning of each of the applications.

The complete test schedule consisted of test (A) repeated three times followed by test (B) repeated twice. Measurements of thickness were made after each test (A) and after each test (B).

The coefficient of friction of the material produced in Example 1 was 0.41, and of that produced in Example 2 was 0.37 during each test (A) and the mean wear of the buttons after each test (A) was, 9.4, 9.2 and $9.6 \times 10^{-3}$ inch, and 17.0 (spurious result), 7.62 and $6.37 \times 10^{-3}$ inch respectively. During each test (B), the coefficients of friction were 0.42 and 0.37 respectively, and the mean wear of the buttons after each test (B) was 9.4 and $10.7 \times 10^{-3}$ inch, and 7.0 and $10.37 \times 10^{-3}$ inch respectively.

Similar buttons manufactured from a frictional material with a conventional resin binder which has been sold widely for automotive disc brakes were tested to the same schedule. During tests (A) the coefficient of friction was 0.32 and the mean wear after each test was 6.6, 5.7 and $4.2 \times 10^{-3}$ inch respectively. In tests (B) the coefficient of friction was 0.38 and the wear after each test was 20.0 and $17.8 \times 10^{-3}$ inch respectively.

Test B is equivalent to normal motoring conditions. It can be seen that the wear of the materials according to the invention was some 50 percent less than the wear of the conventional friction material.

We claim:

1. A friction material comprising from 15–50 percent by volume of an inorganic fiber and from 10–50 percent by volume of a binder, in which the binder consists essentially of metallic sulfide, said metallic sulfide comprising iron sulfide formed in situ by the reaction of sulfur with a member selected from the group consisting of iron powder and lower iron sulfides.

2. A friction material as in claim 1 wherein said inorganic fiber is asbestos.

3. A friction material as in claim 2 wherein copper sulfide is additionally present and is formed in situ by the reaction of sulfur with a member selected from the group consisting of copper powder and cuprous sulfide is also present.

4. A friction material as in claim 1 wherein said iron sulfide is formed from a mixture of ingredients in which the ratio of iron to sulfur is from about 4:1 to about 1:1.5 by weight.

5. A method of forming a friction material which comprises from 15 to 50 percent by volume of an inorganic fiber and from 10 to 50 percent of a binder, in which the binder consists essentially of metallic sulfide, said metallic sulfide consisting essentially of iron sulfide formed in situ by the reaction of sulfur with a member selected from the group consisting of iron powder and lower iron sulfides which comprises compacting a mixture of ingredients which comprises the inorganic fiber, sulfur and a member selected from the group consisting of iron powder and lower iron sulfides; and curing said compacted mixture under a pressure of from about 2 to about 20 tons per square inch at a temperature in the range of from about 80° to about 600° C.

* * * * *